United States Patent [19]

Kawaguchi et al.

[11] Patent Number: 4,570,975
[45] Date of Patent: Feb. 18, 1986

[54] WEBBING LOCKING DEVICE

[75] Inventors: Teruhiko Kawaguchi; Yuji Nishimura, both of Niwa, Japan

[73] Assignee: Kabushiki Kaisha Tokai-Rika-Denki-Seisakusho, Niwa, Japan

[21] Appl. No.: 686,395

[22] Filed: Dec. 26, 1984

[51] Int. Cl.³ .............................................. B60R 21/10
[52] U.S. Cl. .................................. 280/806; 242/107.2
[58] Field of Search ...................... 242/107.2, 107.4 A, 242/107.4 B; 280/806, 807, 808, 801, 803; 297/478, 480

[56] References Cited

U.S. PATENT DOCUMENTS

| | | | |
|---|---|---|---|
| 3,439,932 | 4/1969 | Lewis et al. | 280/806 X |
| 3,504,867 | 4/1970 | Stevenson | 242/107.2 |
| 4,128,261 | 12/1978 | Paitula | 280/806 X |
| 4,420,126 | 12/1983 | Ando | 242/107.2 |
| 4,437,623 | 3/1984 | Wyder | 242/107.2 |
| 4,451,062 | 5/1984 | Ziv | 242/107.2 X |
| 4,492,348 | 1/1985 | Ziv et al. | 242/107.2 |

FOREIGN PATENT DOCUMENTS 2360160 8/1984 Fed. Rep. of Germany ...... 280/806

*Primary Examiner*—John M. Jillions
*Attorney, Agent, or Firm*—Parkhurst & Oliff

[57] ABSTRACT

In a webbing locking device locking an occupant restraining webbing, a movable locking member opposed to a fixed locking member is movable in a direction of a webbing drawing-out and approach to the webbing and trigger means causes the webbing to abut on a portion of the movable locking member, so that the webbing is locked by the fixed and movable locking members.

In the locking of the webbing a webbing drawing-out force is converted to a locking, or clipping, force of the webbing by the movable and fixed locking member.

20 Claims, 5 Drawing Figures

WEBBING LOCKING DEVICE

BACKGROUND OF THE INVENTION

1. Field of the Invention

The present invention relates to a webbing locking device for locking an intermediate portion of an occupant restraining webbing, adapted for use in a seatbelt system for restraining an occupant of a vehicle, particularly, suitable to assemble the same into a webbing retractor disposed on a ceiling of the vehicle.

2. Description of the Prior Art

A webbing retractor is constructed such that a a webbing takeup shaft is secured with one end portion of an occupant restraining webbing and it is rotated in a direction of a webbing winding by a biasing force of a spiral spring so that the webbing can be wound in layers on the takeup shaft. Also, the webbing retractor is generally fixed to a side wall of the vehicle and the webbing which has been unwound from the takeup shaft is turned back at a slip joint mounted on an upper portion of the vehicle and, thereafter, it is applied to the occupant as a shoulder webbing.

In such a seatbelt system, since the webbing is turned back sharp at the slip joint, there is such a problem that a frictional resistance between the webbing and the slip joint is increased when the webbing is moved.

In order to overcome the above problem such a system has been proposed that the webbing retractor is mounted on a side of the ceiling or an upper side of a center pillar of the vehicle and the webbing is drawn out through an opening of a panel of the ceiling or the center pillar. In this case the webbing is slightly turned at the opening, an angle of which is small, so that a frictional resistance between the webbing and the opening becomes small when the webbing is moved.

On the other hand, the webbing retractor is generally provided therein with a webbing locking device for preventing the webbing from unwinding in an emergency situation of the vehicle. The webbing locking device can roughly be classified in two types, one type being directed to a locking mechanism comprising a combination of a ratchet wheel fixed to the takeup shaft and a pawl engaged with the ratchet wheel and the other type being directed to a locking mechanism disposed adjacent to the webbing retactor, in which a pair of lock members clip, or lock, the webbing in the emergency situation of the vehicle.

In the former type mechanism, however, there is such a problem that a winding diameter of the webbing retactor must be made large. In the latter type, also, there is such a fear that when a large drawing-out force acts upon the webbing the webbing is slipped out and there is such a problem that such acceleration sensing means as an inertia weight can not be applied directly to the same since a large force is required in order to operate the pair of lock members.

SUMMARY OF THE INVENTION

In view of the above facts, the present invention has, as its object, the provision of a webbing locking device capable of locking the webbing surely, to which the acceleration sensing means is applicable directly.

In a webbing locking device according to the present invention, a movable locking member opposed to a fixed locking member is movable in a webbing drawing-out direction by means of guide means and a webbing is caused to abut on a portion of the movable locking member by acceleration sensing means through trigger means, so that a webbing drawing-out force serves as a locking, or clipping, force of the movable locking member and the fixed locking member.

In one aspect of the webbing locking device, the movable locking member is moved in the webbing drawing-out direction by the webbing drawing-out force and the locking force is increased by so-called wedge action. Description will hereinunder be given of an embodiment of the present invention with reference to the drawings attached hereto.

DESCRIPTION OF THE PREFERRED EMBODIMENT

Figure 1:
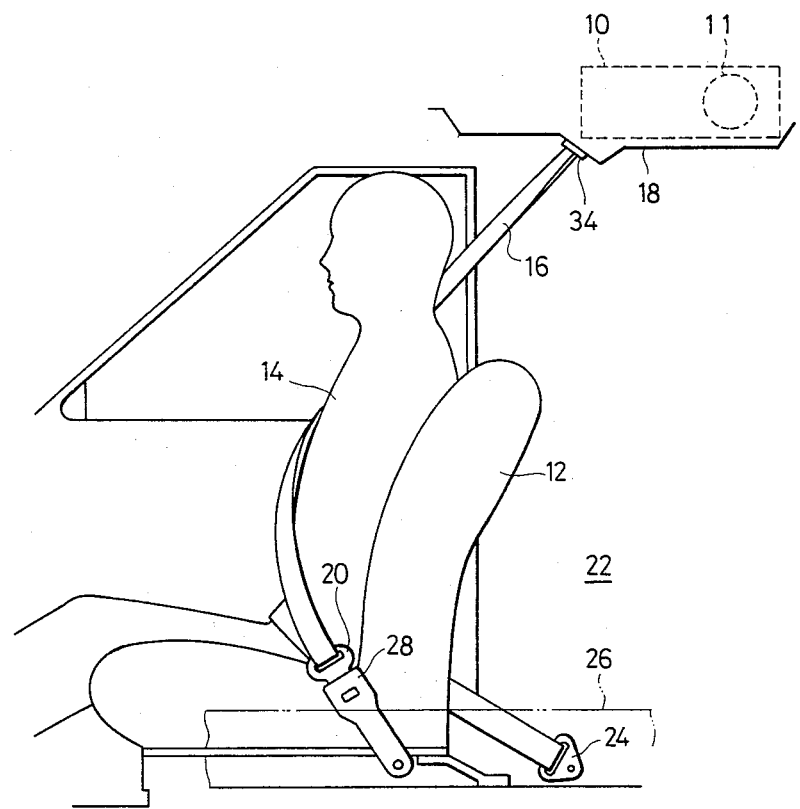
FIG. 1 is a side view of a seatbelt system applied to an occupant, to which a webbing locking device according to the present invention is applied.

In FIG. 1, there is shown a seatbelt system to which a webbing locking device 10 according to the present invention is applied.

The seatbelt system is constructed such that an occupant 14 sitting on a seat 12 can be put in a restrained situation by a webbing 16 of a three point type. One end portion of the webbing 16 is wound in a webbing retractor 11 disposed in a roof side inner panel 18, and after the other end portion thereof is turned back at a tongue plate 20 it is secured to an anchor plate 24 provided on a lower portion of a side wall 22 of a vehicle.

The tongue plate 20 is capable of being latched to a buckle device 28 mounted projectingly on a channel portion 26 positioned at an approximately central portion of the vehicle. Accordingly, when the tongue plate 20 is latched to the buckle device 28 after the occupant 14 sits on the seat 12, a portion of the webbing 16 positioned between the tongue plate 20 and the anchor plate 24 serves as a lap webbing and a portion thereof between the tongue plate 20 and the webbing retractor 11 serves as a shoulder webbing.

Figure 2:
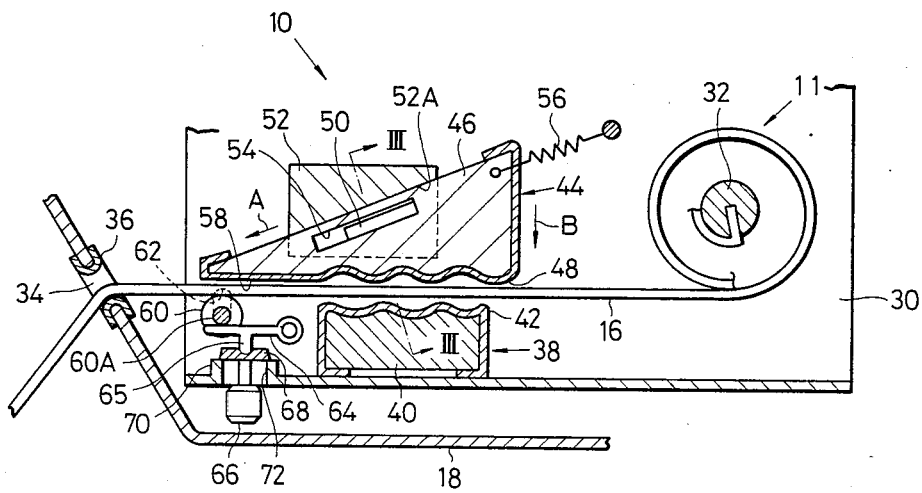
FIG. 2 is a vertical sectional view of the webbing locking device.

The webbing retractor 11 is disposed between the roof side inner panel 18 and a roof side outer panel (not shown), as shown in FIG. 2. In the webbing retractor 11 the one end portion of the webbing 16 is secured to a webbing takeup shaft 32 rotatably supported by a frame 30 and it is wound in layers on the takeup shaft 32 by a biasing force of a spiral spring (not shown).

The webbing 16 drawn out of the webbing retractor 11 is bent gently at an opening 34 through which the webbing 16 is extended in an inside of the vehicle. The opening 34 is formed at its inner peripheral face with a resin coating layer 36 so that a frictional force occurring between the webbing 16 and the opening 34 is reduced.

The webbing locking device 10 according to the present invention is disposed between the webbing retractor 11 and the opening 34. In the webbing locking device 10, fixed to a lower portion of the frame 30 fixed to a ceiling side of the vehicle is a fixed locking member 38. The fixed locking member 38 includes a core 40 having a rectangular configuration and a lock plate 42 having a wave-shaped portion and covering the core 40, and the lock plate 42 is positioned at a nearer portion to the webbing 16 than the core 40.

Figure 3:
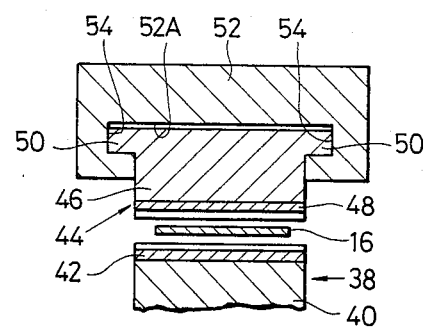
FIG. 3 is a sectional view of FIG. 2 taken along a line III—III.

Also, disposed at an opposed side to the fixed locking member 38 is a movable locking member 44 with the webbing 16 positioned between the fixed and the movable locking members 38 and 44. The movable locking member 44 includes a core 46 having a triangular configuration and a lock plate 48 having a wave-shaped portion and a flat portion 58 contiguous thereto and covering the core 46, and the wave-shaped portion and the flat portion 58 are opposed to the webbing 16. The core 46 is formed at its both sides with a pair of protrusions 50 which are received in grooves 54 of a guide member 52, as shown in FIG. 3.

The guide member 52 is fixed to an upper portion of the frame 30, and the movable locking member 44 is supported movably by a lower slope face 52A of the guide member 52 inclined to the webbing 16 and the grooves 54 thereof so that the movable locking member 44 can be guided in a direction of arrow A shown in FIG. 2. The movable locking member 44 is secured at its one end portion with one end of a tension coil spring 56, the other end of which is secured to the frame 30 through a pin, so that the movable locking member 44 is always biased in its back and oblique direction.

Accordingly, when the webbing 16 is drawn out of the webbing retractor 11 while the webbing 16 is abutting on the flat face 58 of the movable locking member 44, the movable locking member 44 is also moved in the webbing drawing-out direction (the front direction of the vehicle) and the webbing 16 is locked, or clipped, by the lock plate 48 and the lock plate 42 of the fixed locking member 40 due to a frictional force occurring between the webbing 16 and the flat portion 58.

Disposed in front of the fixed locking member 38 is a roller 60, an outer peripheral face of which is opposed to a lower face of the webbing 16. The roller 60 is provided at its both end portions with small diameter portions 60A which are received in long holes 62 of the frame 30, whereby it is movably supported upwardly by the frame 30. In addition, one of the small diameter portions 60A abuts, at its lower face, on a forward end portion of a lever 64 rotatably supported by the frame 30. The lever 64 is formed at its intermediate and lower portion with a protrusion 65 which abuts on a head 68 of an inertia weight 66. The inertia weight 66 is supported by a seat 70 formed on a lower portion of the frame 30 and it is suspended through a through-hole 72 formed at a central portion of the seat 70.

The inertia weight 66 is swung to rotate the lever 64 in a clockwise direction on FIG. 2, when it is subjected to a high acceleration in an emergency situation of the vehicle. Also, when the lever 64 is rotated in this manner, the roller 60 is pushed up so that the webbing 16 is caused to abut on the flat face 58 of the movable locking member 44. Thus, the inertia weight 66 constitutes acceleration sensing means for the emergency situation of the vehicle, and the roller 60 and the lever 64 constitute trigger means for locking the webbing 16.

Description will now be given of the operation of the above embodiment.

In a full winding, or retraction, situation of the webbing 16, the webbing 16 is wound on the takeup shaft 32 by the biasing force of the spiral spring in an predetermined amount and the remaining portion of the webbing 16 is positioned between the opening 34 and the anchor plate 24 under its tensioned situation. Also, the movable locking member 44 and the fixed locking member 38 are opposed to the webbing 16 with predetermined spaces.

In this situation when the tongue plate 20 is pulled by the occupant 14 the webbing 16 is drawn out of the opening 34 of the roof side inner panel 18. When the tongue plate 20 is latched to the buckle device 28 the occupant 14 is put in the restrained situation by the webbing 16, as shown in FIG. 1. At this time, as a bent angle of the webbing 16 at the opening 34 is small, as shown in FIG. 2, a drawing-out force for pulling out the webbing 16 of the embodiment is smaller than that of a conventional through-ring type or a conventional slip joint type.

Next, when the vehicle is in an emergency situation, the inertia weight 66 is swung largely and the lever 64 is rotated in the clockwise direction, so that the roller 60 is pushed up. Also, the webbing 16 is pushed up by the roller 60 and the webbing 16 is caused to abut on the flat face 58 of the movable locking member 44.

Since a large drawing-out force acts upon the webbing 16 in the emergency situation, the movable locking member 44 is moved in the webbing drawing-out direction (the front direction of the vehicle) due to the frictional force between the movable locking member 44 and the webbing 16 against the tension of the tension coil spring 56.

On the other hand, the movable locking member 44 is moved not only in the front direction of the vehicle but also in the direction of the fixed locking member 38 (in a direction of arrow B shown in FIGS. 2 and 4), since the guide member 52 is formed with the grooves 54 and the lower slope face 52A. Accordingly, the webbing 16 is locked by both the lock plates 42 and 48, whereby it is prevented from being drawn out, so that the occupant 14 is securely kept in the restrained situation by the webbing 16.

Figure 4:
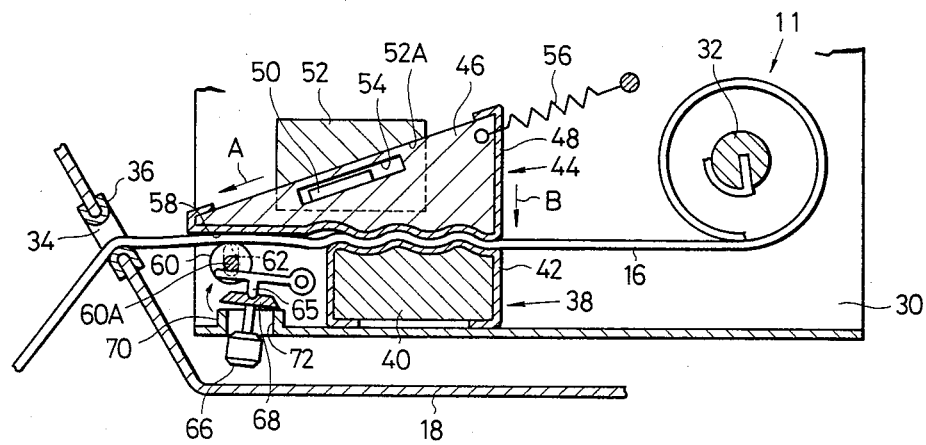
FIG. 4 is a vertical sectional view similar to FIG. 1, in which the webbing is put in a locked situation.

In the situation shown in FIG. 4. even though a larger drawing-out force than the above large force acts upon the webbing 16, a slip does not occur between the webbing 16 and the lock plates 42 and 48 since the larger drawing-out force is converted to a locking force for locking the webbing 16. That is to say, as the movable locking member 44 reveals the so-called wedge effect along the guide member 52, the webbing 16 is securely prevented from being drawn out.

When the vehicle is released from the emergency situation, the drawing-out force of the webbing 16 is reduced or is made zero and roller 60 is lowered so that the movable locking member 44 is moved in the rear direction of the vehicle by the tension coil spring 56 and it is returned back to an initial situation shown in FIG. 2.

When the occupant 14 gets off the vehicle, the tongue plate 20 is released from the buckle device 28 by the occupant 14, so that the occupant 14 is released from the restrained situation by the webbing 16 and the webbing 16 is wound in the webbing retractor 11 by the predetermined amount.

As set forth above, in the webbing locking device 10 according to the present invention the webbing 16 can securely be locked by the webbing locking action in the emergency situation of the vehicle, Also, the roller 60 and the lever 64 serve only as the trigger means, which does not require a large pushing-up force. Consequently, an inertia weight of a pendulum type can be applied to the present invention. Furthermore, the moving amounts and the size of the movable locking member 44 in the upper and lower directions can be reduced as compared with a conventional movable locking member, whereby a projection amount of a portion receiving the webbing locking device 10 to the inside of the vehicle can be reduced.

Figure 5:
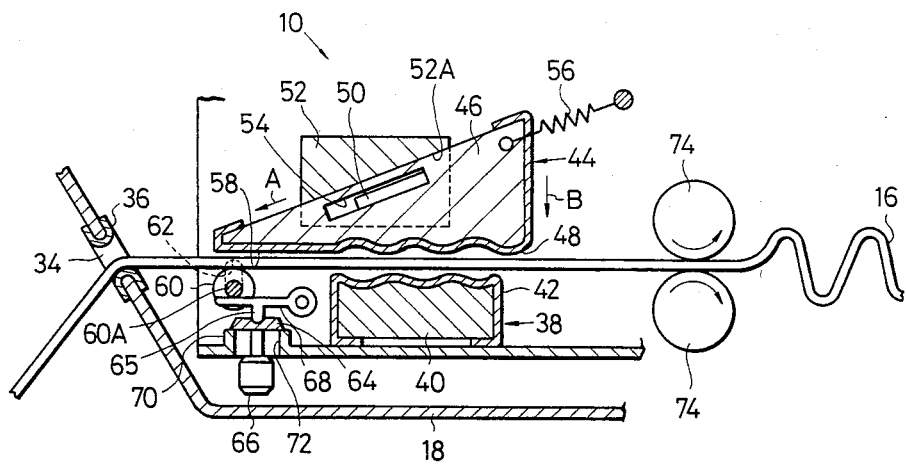
FIG. 5 is a simplified view showing another embodiment of a webbing retractor.

In addition, the webbing retractor 11 can be constructed such that the webbing 16 is withdrawn linearly by a pair of rollers 74 instead of the takeup shaft 32, as shown in FIG. 5, whereby a space corresponding to the winding diameter of the webbing 16 on the takeup shaft 32 can be reduced so that a projection amount of the roof side inner panel 18 to the inside of the vehicle can be more reduced than the above first embodiment.

In the above embodiments the webbing locking device 10 and the webbing retractor 11 are mounted on the side of the ceiling of the vehicle but they can be housed in a center pillar. Also, the webbing locking device 10 can be assembled in a conventional webbing retractor mounted on a side wall of the vehicle. In addition, the webbing locking device 10 can be constructed such that the movable locking member 44 and the guide member 52 are disposed at a lower portion of the vehicle and when the vehicle is released from the emergency situation the movable locking member 44 is returned back to the initial situation by its self-weight instead of the tension coil spring 56.

Moreover, instead of the inertia weight 66, another acceleration sensing means detecting a drawing-out force acting upon the webbing 16 to operate the trigger means in the emergency situation of the vehicle can be provide on the webbing locking device 10.

What is claimed is:

1. A webbing locking device adapted for use in a seatbelt system for restraining an occupant of a vehicle by an occupant restraining webbing, which comprises:
   (a) a frame fixed to a vehicle body;
   (b) a fixed locking member fixed to the frame;
   (c) a movable locking member supported movably by the frame to be opposed to the fixed locking member, the movable locking member locking an intermediate portion of the webbing by the same and the fixed locking member in an emergency situation of the vehicle;
   (d) guide means for guiding the movable locking member in a direction of a webbing drawing-out and approach to the fixed locking member;
   (e) trigger means supported by the frame movably in such a direction to cause the webbing to abut on a portion of the movable locking member; and
   (f) acceleration sensing means for detecting a large acceleration to actuate the trigger means in the emergency situation of the vehicle,
   whereby the webbing is locked by the fixed and the movable locking members in the emergency situation of the vehicle.

2. A webbing locking device as set forth in claim 1, wherein the movable locking member is movable along slope faces formed on the same and the guide means to be opposed to each other.

3. A webbing locking device as set forth in claim 2, wherein the guide means is formed with a pair of grooves along the slope face thereof and the movable locking member is formed with a pair of protrusions along the slope face thereof, the protrusions being received in the grooves, whereby the movable locking member is movably supported by the frame through the guide means.

4. A webbing locking device as set forth in claim 1, wherein each of the fixed locking member and the movable locking member is provided at its face opposed to the webbing with a lock plate and the lock plates are formed in wave shape at their portions locking the webbing, whereby a force for locking the webbing is increased.

5. A webbing locking device as set forth in claim 4, wherein the lock plate of the movable locking member is formed with a flat portion contiguous to the wave shaped portion in a drawing-out direction of the webbing and the trigger means is opposed to the flat portion with the webbing positioned therebetween.

6. A webbing locking device as set forth in claim 5, wherein the trigger means includes a roller supported by the frame movably in a direction of approach to the webbing and a lever rotatably supported by the frame to cause the webbing to contact with the flat portion of the movable locking member in the emergency situation of the vehicle.

7. A webbing locking device as set forth in claim 4, wherein the movable locking member is movable along slope faces formed on the same and the guide means to be opposed to each other.

8. A webbing locking device as set forth in claim 6, wherein the movable locking member is movable along slope faces formed on the same and the guide means to be opposed to each other.

9. A webbing locking device as set forth in claim 6, wherein the acceleration sensing means includes an inertia weight suspended from the frame, a head portion thereof abutting on a protrusion of the lever, whereby when the inertia weight is swung largely in the emergency situation of the vehicle, the lever is rotatably pushed up, so that the webbing is caused to contact with the flat portion of the movable locking member.

10. A webbing locking device as set forth in claim 1, wherein the movable locking member is biased by biasing means in a direction of separation from the fixed locking member, whereby the webbing is kept in a movable situation in an ordinary running situation of the vehicle.

11. A webbing locking device as set forth in claim 3, wherein the movable locking member is biased by biasing means in a direction of separation from the fixed locking member, whereby the webbing is kept in a movable situation in an ordinary running situation of the vehicle.

12. A webbing locking device as set forth in claim 4, wherein the movable locking member is biased by biasing means in a direction of separation from the fixed locking member, whereby the webbing is kept in a movable situation in an ordinary running situation of the vehicle.

13. A webbing locking device as set forth in claim 1, which further comprises a pair of rollers for withdrawing the webbing in the frame.

14. A webbing locking device as set forth in claim 3, which further comprises a pair of rollers for imparting a tension on the webbing to withdraw the webbing in the frame.

15. A webbing locking device as set forth in claim 4, which further comprises a pair of rollers imparting a tension on the webbing to withdraw the webbing in the frame.

16. A webbing locking device adapted for use in a seatbelt system of a vehicle to lock an intermediate portion of an occupant restraining webbing in an emergency situation of the vehicle, which comprises:

(a) a frame fixed to a vehicle body;
(b) a fixed locking member fixed to the frame;
(c) a movable locking member supported movably by the frame to be opposed to the fixed locking member, the movable locking member locking the intermediate portion of the webbing by the same and the fixed locking member in the emergency situation of the vehicle;
(d) guide member fixed to the frame, for guiding the movable locking member in a direction of a webbing drawing-out and approach to the fixed locking member;
(e) trigger means disposed in front, in the webbing drawing-out direction, of the fixed locking member and supported by the frame movably in such a direction to cause the webbing to abut on a portion of the movable locking member;
(f) acceleration sensing means for detecting a large acceleration to actuate the trigger means, thereby causing the webbing to abut on the portion of the movable locking member in the emergency situation of the vehicle; and
(g) a pair of rollers disposed at the rear, in the webbing drawing-out direction, of the fixed and movable locking members, for imparting a tension on the webbing to withdraw it in the frame, whereby the webbing is locked securely by the fixed and movable locking members in the emergency situation of the vehicle.

17. A webbing locking device as set forth in claim 16, wherein the movable locking member is movable along slope faces formed on the same and the guide member to be opposed to each other.

18. A webbing locking device as set forth in claim 17, wherein each of the fixed locking member and the movable locking member is provided at its face opposed to the webbing with a lock plate and the lock plates are formed in wave shape at their portions locking the webbing, whereby a force for locking the webbing is increased.

19. A webbing locking device as set forth in claim 18, wherein the trigger means includes a roller supported by the frame movably in a direction of approach to the webbing to contact with the movable locking member in the emergency situation of the vehicle.

20. A webbing locking device as set forth in claim 19, wherein the movable locking member is always biased by biasing means in a direction of separation from the fixed locking member, whereby the webbing is kept in a movable situation in an ordinary running situation of the vehicle.

* * * * *

Notice of Adverse Decision in Interference

In Interference No. 101,932, involving Patent No. 4,570,975, T. Kawaguchi, Y. Nishimura, WEBBING LOCKING DEVICE, final judgement adverse to the patentees was rendered Sept. 10, 1990 as to claims 1-4, 7 and 10-18.

*(Official Gazette March 5, 1991)*